United States Patent Office 3,412,390
Patented Nov. 19, 1968

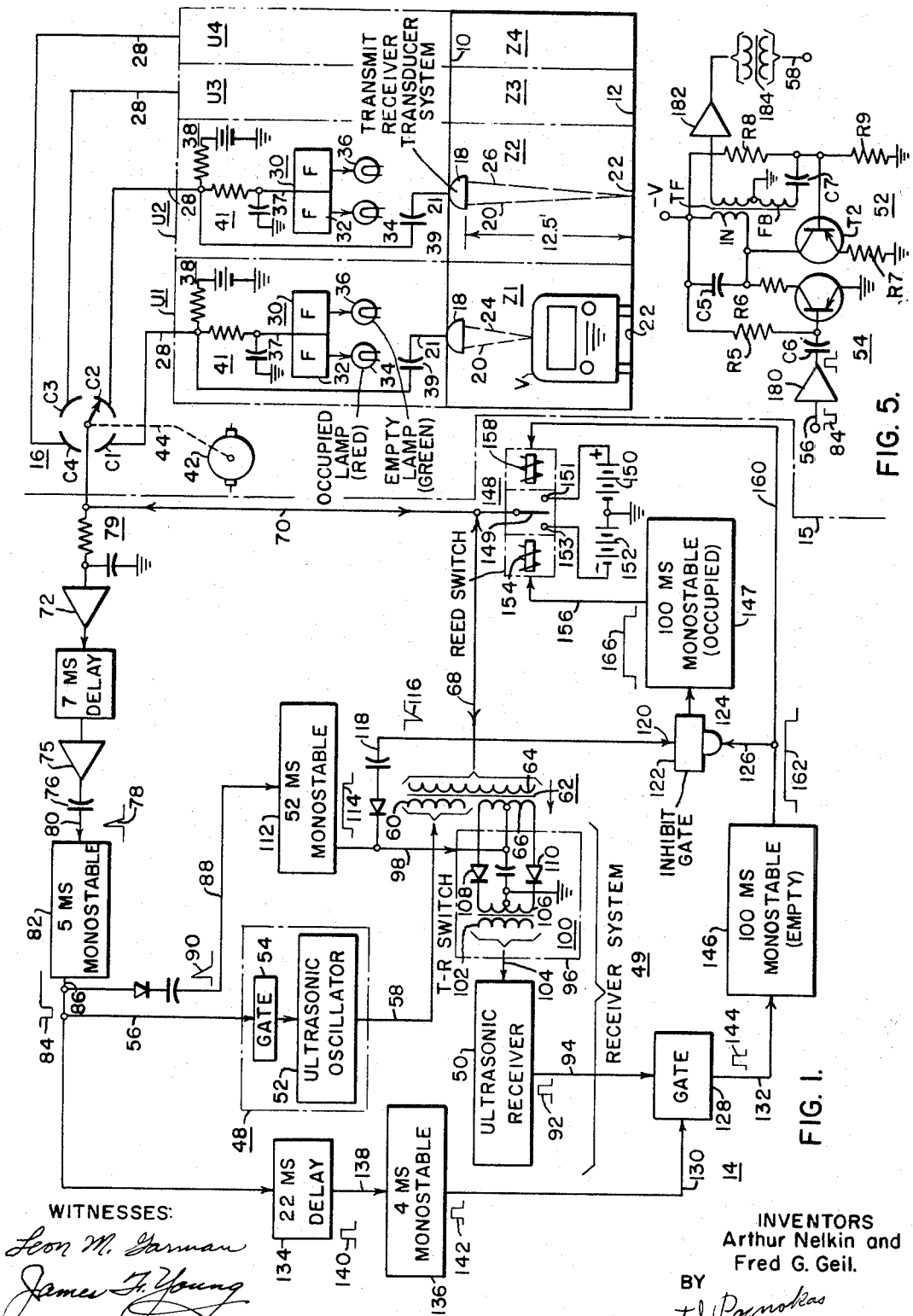

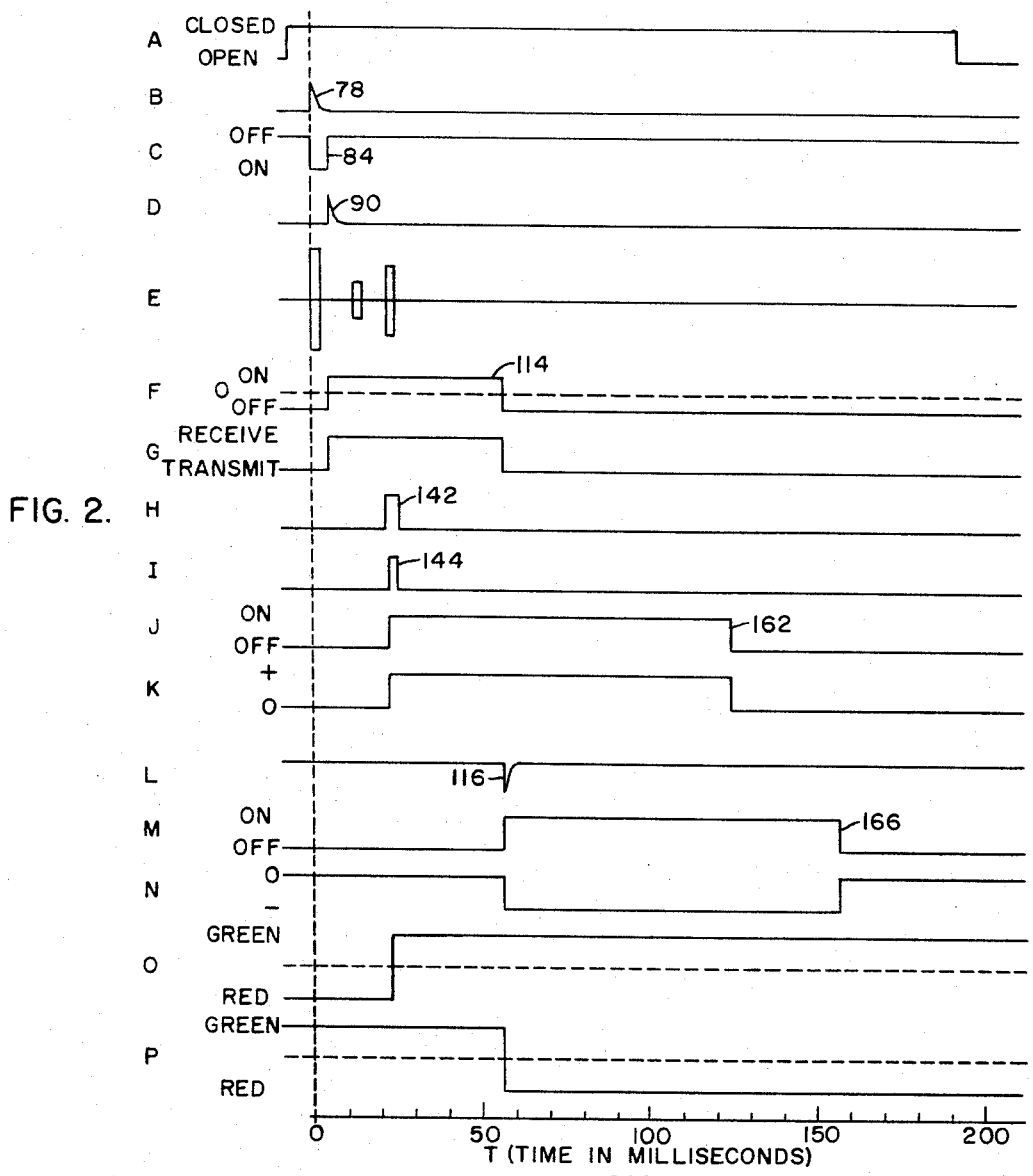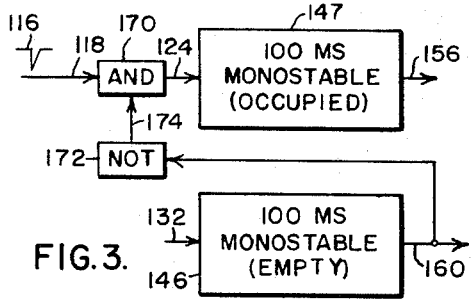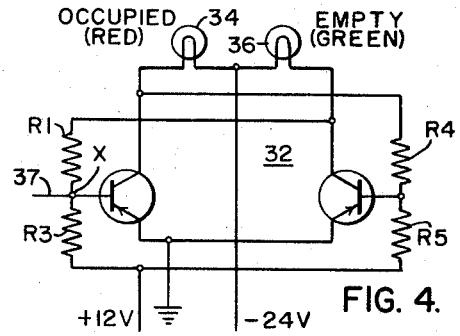

3,412,390
ECHO RANGING SYSTEM FOR MONITORING PLURALITY OF DETECTION ZONES TO DETERMINE PRESENCE OR ABSENCE OF OBJECTS
Arthur Nelkin and Frederick G. Geil, Pittsburgh, Pa., assignors to Westinghouse Electric Corporation, Pittsburgh, Pa., a corporation of Pennsylvania
Filed Oct. 14, 1965, Ser. No. 496,070
8 Claims. (Cl. 340—280)

ABSTRACT OF THE DISCLOSURE

An echo ranging system is disclosed for monitoring a plurality of detection zones to determine the presence or absence of objects. Each detection zone is equipped with a transmit-receive ultrasonic transducer system directed toward a fixed reflecting surface with each of the detecting zones being monitored to determine the presence or absence in any zone of an object between the transducer system and the fixed reflecting surface. Central interrogation controlled apparatus is provided with an oscillator and a detector for detecting the electrical output status of the transducer system. This apparatus is periodically connected by a commutator to each zone in sequence for a dwell time during which the oscillator energizes the transducer system to provide an ultrasonic output. The detector detects the electrical output status of the transducer system and in accordance therewith an "occupied" or an "empty" signal is produced and supplied to an indicator which indicates the presence or absence of an object in the detection zone under surveillance.

This invention relates to echo ranging systems using propagated wave energy for detecting the presence or absence of objects in prescribed detection zones.

While not limited thereto a specific form of the invention is directed to a system for periodically and sequentially monitoring a plurality of detection zones to determine whether any zone is empty or occupied by an object. For example, the invention may be employed to interrogate a plurality of parking spaces or stalls in a garage through a remotely controlled system which provides an indication such as a lighted display on a central dispatcher's board as to whether each stall in the garage is empty or occupied.

Wave energy echo ranging detection systems, for example electroacoustic sonic systems, have been heretofore proposed for the detection of vehicles as they pass through a prescribed detection zone, mainly for the purpose of counting vehicles and/or to operate traffic signals. The present invention employs echo ranging in a simple, economical and reliable system for monitoring a plurality of detection zones by having each zone successively interrogated in a cyclically repeated sequence by a central interrogation system which processes the results of the interrogation to provide, at a remote location, information such as lighted lamps indicating the presence or absence of an object in any of the detection zones.

It is therefore an object of the present invention to provide simple, economical and reliable echo ranging apparatus for monitoring a plurality of locations to determine the presence or absence of an object at any of the locations.

In one embodiment of the invention each of a plurality of detection zones has associated therewith a two-way (transmit-receive) transducer system directed toward a fixed reflecting surface. A central interrogation control apparatus including a transmitter, a detection system for detecting the receive output status of the transducer system, and decision circuitry, is sequentially connected to the transducer system of each zone for a particular dwell time by a single commutator or sequencing switch, which, during the dwell time, conveys a timing signal to the central control apparatus, conveys electric energy from the transmitter to the transducer system for conversion to a burst of wave energy, connects the detection system to the transducer system so that it is subject to the receive output status of the transducer system, and transmits to a display center the decision made by the detection system based on the receive output status of the transducer system which in turn is dependent upon whether or not an object is interposed between the transducer system and the associated reflecting surface.

It is therefore another object of the invention to provide a system for monitoring a plurality of detection zones wherein the system employs a single sequencing switch or commutator for conveying between a central control apparatus and an association including a transducer system and an indicating system, timing signals, transmit information, receive information, and decision information.

Because all information is transmitted through a single contact arm, a single commutator avoids synchronizing and other problems that go along with a plurality of commutators for performing the indicating functions.

Another aspect of the invention is directed to the central interrogation control apparatus.

Other and further objects and advantages of the invention will become apparent from the following detailed description taken in connection with the drawings wherein a preferred embodiment of the invention is illustrated.

In the drawings:

FIGURE 1 is a hybrid diagram predominantly in block form of a garage stall monitoring system embodying the invention;

FIG. 2 is a timing and logic chart illustrating the operation of the system in FIG. 1;

FIG. 3 is a variation of a circuit detail in FIGURE 1;

FIG. 4 is a diagram showing details of a part of the system in FIGURE 1; and

FIG. 5 is a diagram of an example of a gate controlled transmitter which may be employed in FIG. 1.

Throughout the specification and claims where the term "sonic" is employed, it is intended to comprehend all forms of wave motion produced by physical vibration and is thus inclusive of ultrasonic energy as well as audio frequency energy. The term "wave energy" wherever referred to, pertains to all forms of energy which may be transmitted through space in a relatively confined beam and thus includes the aforementioned sonic energy but is not necessarily limited thereto.

Although the present invention may be practiced with all forms of wave energy, sonic wave energy and in particular ultrasonic wave energy is especially suitable in connection with the invention. A highly successful operating example of the disclosed embodiment was designed for operation with 40 kc. (kilocycles) ultrasonic energy. For exemplary purposes only, and not in any limiting sense, the disclosed embodiment will be described as a 40 kc. ultrasonic system.

By way of example four detection zones Z are shown in FIG. 1 as four stalls or parking spaces Z1–Z4 of an enclosed garage having a ceiling 10 and a floor 12. The purpose of the system in FIG. 1 is to monitor the zones Z1–Z4 to determine whether or not there is a vehicle in any of the zones. The system in FIG. 1 may be divided in three convenient parts; a plurality of interrogation units U (U1–U4), one associated with each detection zone; central interrogation control apparatus 14 lying on the left side of dashed line 15; and a periodic sequencing switch or commutator 16 for establishing communication between the central interrogation control apparatus 14 and the interrogation units U.

All of the interrogation units U being alike only two, U1 and U2, are shown in detail. Each interrogation unit U includes a transmit-receive transducer system 18 for converting undulating electric current, carried by a line 21, to an incident burst 20 of wave energy directed through space toward a fixed reflecting surface 22, and for converting echoes or reflections 24, 26 of the incident burst 20 into corresponding electrical energy to be transmitted along the line 21 to the central interrogation control apparatus 14. Thus each transducer system 18 has a transmit and receive mode, it being in the transmit mode when it is converting electrical energy to wave energy, and in the receive mode between transmission times. The receive output of a transducer system may be zero on line 21 when no reflections (echoes) are received by the transducer's system, or a current on line 21 due to reflections received by the transducer system. Thus the receive output status of the transducer system may be zero representing no echo or a current representing an echo, depending on whether or not reflections are received by the transducer system. In the example shown the fixed reflecting surface 22 aligned with each detection zone Z is a portion of the garage floor 12 associated with each zone.

The transducer system 18 may include separate transmit and receive transducers or it may comprise only a single transducer operable to convert electric energy into ultrasonic wave energy and vice versa. The transducers employed may for example be of the piezoelectric type, which are well known in the art and need no further description.

Each interrogation unit U also includes an indicator unit 30 which indicates whether the associated detection zone is empty or occupied in accordance with signals received along a line 28 through the commutator switch 16 from the interrogation control apparatus 14. The indicator unit 30 may, for example, include a flip-flop 32 and a pair of lamps 34 and 36 selectively energized by the flip-flop in accordance with signals applied by conductor 28 to the trigger input line 37 of the flip-flop. In the arrangement shown a negative signal of at least a predetermined value applied to the input of the flip-flop 32 will set the flip-flop to the stable state wherein lamp 34 is energized. On the other hand if a positive signal of at least a predetermined value is applied to the input of flip-flop it will assume its other stable state wherein lamp 36 will be energized. In the example shown lamp 34 when lighted indicates an occupied zone while lamp 36 when lighted indicates that the associated zone is empty. The lamps 34 and 36 may be arbitrarily colored red and green respectively.

Each interrogation unit U further includes means for continuously applying a timing potential level to line 28 such as will provide a timing signal to the control apparatus 14, but which will not reach the threshold values required to switch the flip-flop 32. The required timing potential level may be positive, ground level, or negative depending on the design of the input element of the control apparatus 14. In the case illustrated it is assumed that a slightly positive potential level is required to initiate operation of the control apparatus 14. This may be supplied to conductor 28 by a source represented by the battery-resistor combination 38.

Line 21, which is connected to conductor 28, includes a capacitor 39 which passes the operating frequency of the system (example 40 kc.) but blocks D.C. from the transducer system 18. A decoupling network 41, associated with the input line 37 to the indicator unit 30, blocks the 40 kc. signal from the indicator unit while allowing direct current to pass to and from the unit.

The input-output information line 28 of each unit U is connected to a different one of a plurality of contacts C of the commutator 16. More specifically line 28 of unit U1 is connected to contact C1, line 28 of the unit U2 is connected to contact C2, line 28 of unit U3 to contact C3, and line 28 of line U4 to contact C4. Contacts C1–C4 are of uniform length along and symmetrically spaced around a circle. Commutator 16 is further provided with a rotating contact arm 40 which sequentially engages contacts C1–C4 as it is driven by motor 42 whose output is connected through a coupling 44 to the switch arm 40.

Contact arm 40 is connected to the input-output information line 46 of the interrogation control apparatus 14.

As a result of this arrangement, when the switch arm 40 is rotating at a given speed, the commutator 16 periodically connects the information line 46 sequentially to each of the information lines 28 for a given length of time which is the dwell time during which the contact arm 40 is in continuous engagement with a contact C. It will be apparent that each time contact arm 40 engages one of the contacts C1–C4, there will be applied to information line 46 a timing signal derived from the timing potential source 38 of the then connected interrogation unit U. For example, when arm 40 engages contact C2 (position shown in FIG. 1), a timing pulse derived from the timing potential source 38 of unit U2 will be applied to the information line 46.

By way of example, the relations of the elements of commutator switch 16 and the motor 42 speed are such that each of the respective contacts C1, C2, C3 and C4 is engaged by the arm 40 once every 30 seconds for a dwell time of 200 ms. (milliseconds). Thus each contact C occupies about 9.6° of the circle, with a spacing between contacts of about 80.4°. It will be appreciated that for the sake of greater clarity in the drawing there has been no attempt to maintain proportions between the commutator elements consistent with the dimensional example just given.

It should be understood that the type of commutator or sequencing switch shown at 16 is by way of example only and that other commutator types may be employed, for example such as may be formed by a plurality of magnetic reed switches disposed in a circle and sequentially actuated by a rotating magnetic arm. Other suitable sequencing switches include electronic commutators such as ring counters and others.

Within the 200 ms. dwell time during which the commutator arm 40 engages a contact C, the interrogation control apparatus 14 interrogates the then connected unit U in response to a timing or marker pulse on conductor 46 derived from the timing potential source 28 of that unit U. During that interrogation, the apparatus 14 performs the following functions, (a) a transmitter system 48 provides a short burst of electrical oscillations for conversion to an incident burst 20 of ultrasonic wave energy by the transducer system 18 of the unit U under the interrogation, (b) a detection system including an ultrasonic receiver system 49 and associated circuitry respond to the receive output status of the then connected transducer system, and in accordance with that status supplies to the line 46 and thereby to the indicator system 30 of the then interrogated unit U, an OCCUPIED or an EMPTY signal depending on whether an object is present in or absent from the then interrogated detection zone.

By way of example the interrogation control apparatus 14 may take the specific form shown in FIG. 1.

The transmitter system 48 by way of example includes an ultrasonic oscillator 52 and a gate 54 coupled to the oscillator for turning the oscillator on for a predetermined length of time for instance 2 milliseconds in response to the receipt of a pulse of suitable polarity, for example a negative going pulse along a line 56. The output of the oscillator 52 is supplied along a line 58 to a winding 60 of a transformer 62. In addition to winding 60, transformer 62 includes a winding 64 inductively coupled to winding 60 and a center tapped winding 66 inductively coupled to the winding 64. Output oscillations from transmitter 48 carried by winding 60 induce corresponding electrical oscillations in winding 64 which is connected through lines 68 and 70 to line 46.

The timing signal supplied to line 46 through the commutator 16 is passed through an inverting amplifier 72, delayed for a predetermined time for example 7 milliseconds by a delay 74, and then passed through an inverting amplifier 75 and pulse shaping means such as a capacitor 76 to provide a pulse 78 on a line 80. A decoupling network 79 associated with the input line to amplifier 72, prevents the 40 kc. signals from affecting the amplifier, but does not block the passage of D.C. timing signals to the amplifier input.

Both the dwell time of commutator arm 40 with any contact C and the resulting timing signal applied to line 46 may be represented by curve A in FIG. 2. Curve B represents pulse 78.

Pulse 78 is a timing signal utilized to immediately trigger transmitter 48 for example by means of a monostable circuit 82, which in response to pulse 78, produces during the stay in its quasi-stable state a 5 millisecond pulse 84 (curve C, FIG. 2) on an output line 86 after which the monostable reverts to its stable state to produce on a line 88 an oppositely going pulse 90 (curve D, FIG. 2). Thus pulse 90 occurs 5 milliseconds after pulse 78.

By way of example the transducer system 18 is 12.5 feet from the reflecting surface 22. Thus the total transit or round trip time of an ultrosonic incident burst 20 from the transducer system to the reflecting surface 22 and its reflection 26 back to the transducer system 18 is approximately 23 milliseconds. On the other hand the round trip time of incident 20 and reflected wave energy 24 between the transducer system 18 and the top of a vehicle as in zone 1 may for example be about 11 milliseconds.

At E in FIG. 2, the incident burst is shown at 20, the echo received by transducer from top of vehicle (if present) is at 24, while the echo received by the transducer from the floor (no vehicle) is shown at 26. It should be noted that all the representations in FIG. 2 are related to the same time base.

Receiver system 49 includes an ultrasonic receiver 50 tuned to produce an output pulse 92 on a line 94 in response to the receipt of electrical oscillations (40 kc. example) such as derived from a transducer system 18 in response to reflections of wave energy received by the transducer system. Receiver system 49 also includes a normally open T-R (transmit-receive) switch 96 connected to the receiver 50 and the transformer winding 66. When it is closed by an appropriate signal on its control input line 98, T-R switch 96 couples receiver 50 to transformer 62 and thereby to line 46. In the example shown T-R switch 96 includes a transformer 100 having a secondary winding 102 connected to the input line 104 of the receiver, and a center-tapped primary winding 106 whose ends are coupled through diodes 108 and 110 to the ends of winding 66 of transformer 62. The center tap of winding 106 is connected to ground, while the center tap of winding 66 is connected to the input control line 98 of the T-R switch 96. Normally, diodes 108 and 110 are reverse-biased by a negative voltage on line 98 whereby the T-R switch is normally open to prevent the receiver 50 from receiving signals from transformer 62.

A few milliseconds after transmitter 48 fires its oscillatory burst in response to pulse 84, receiver 50 is coupled to the line 46 for a predetermined period of time which encompasses the anticipated receipt times of reflections from the reflecting surface 22 and from the top of a vehicle as the case may be. This accomplished for example by applying pulse 90 through line 88 to the input of a monostable circuit 112 which responds to produce during its quasistable state an output pulse 114 on a line 98 having a predetermined length, for example 52 milliseconds, after which it reverts to its stable state. The monostable 112 is arranged to produce a negative output on line 98 while it is in the stable state. Thus during the normal or stable condition of the monostable diodes 108 and 110 are reversed biased and T-R switch 96 is open. However, the output pulse 114 produced by the monostable 112 while in the quasi-stable state is positive thus forward biasing diodes 108 and 110 for the 52 millisecond duration of pulse 114 (curve F, FIG. 2), thereby to close the T-R switch 96 (curve G, FIG. 2) and couple the receiver 50 to transformer 62 and the line 46 during the 52 ms. extent of pulse 114.

When monostable 112 reverts to its stable state, its output on line 98 goes negative to produce a negative going pulse 116 (curve L, FIG. 2) on a line 118 connected to one input 120 of an inhibit gate 122. The latter gate permits the passage of a signal from its input 122 to its output line 124 at any time unless an inhibit signal of the proper polarity is present on the inhibit input line 126 of the inhibit gate.

The output line 94 of the receiver 50 is connected to one input of a coincidence gate 128 having a second input line connected to a line 130, and an output line 132. Means, for example a delay 134 and a monostable circuit 136 is provided to apply to the input line 130 a pulse 142 (curve H, FIG. 2) for a predetermined length of time encompassing the expected arrival time of the reflection at the transducer system 18 of wave energy reflected from the reflecting surface 22 as a result of the incident burst of wave energy 20 initiated by the transmitter 48 in response to the pulse 84, but not including the expected arrival time of a reflection from the top of an object such as a vehicle if the then interroged detection zone is occupied. Since the round trip time of an incident burst from the transducer system to the reflecting surface 22 and back to the transducer system 18 is approximately 23 milliseconds for the example shown, the time delay 134 connected to line 86 is arranged to provide on a line 138 a pulse 140, 22 milliseconds after pulse 78. In turn pulse 140 is applied to the input of the monostable 136 which, in response to that pulse, provides while in its quasi-stable state an output pulse 142 on line 130 having a duration of 4 milliseconds, after which the monostable reverts to its stable state. It should be apparent from the above that gate 128 will provide an output pulse 144 on line 132 if the then connected transducer system 18 receives reflections from the reflecting surface 22. If as in detection zone Z2 there is no intervening object to block the incident energy beam 20, the receiver 50 will produce an output pulse 92 on line 94 at the same time that pulse 142 is applied to the input 130 of gate 128 thereby to produce an output pulse 144 (curve I, FIG. 2) on the output line 132 of the gate. The output pulse 144 from the gate 128 is utilized to apply an EMPTY signal to line 46 and thereby to the indicator system 30 of the then interrogated unit U.

As hereinbefore noted the exemplary indicator circuit 30 is arbitrarily designed to provide an object-absent or "empty" indication in response to a positive polarity signal on the input line 37 to the flip-flop 2, and an object-present or "occupied" indication in response to a negative polarity signal on the input line to the flip-flop. For convenience, a proper polarity signal sufficient to drive the flip-flop to an "empty" indication is referred to as an "EMPTY" signal, and a proper polarity signal sufficient to drive the flip-flop to an "occupied" indication is referred to as an OCCUPIED signal. Respective EMPTY and OCCUPIED signals are supplied to conductor 46 in the described example by an arrangement including monostable circuits 146 and 147, a reed relay 148 and a battery 150. The reed relay 148 includes a single-pole, self-centering double-throw reed switch, the switch blade 149 being connected to line 70, one throw contact 151 being connected to the positive end of battery 150, and the other throw contact 153 being connected to the negative end of a battery 152. The positive end of battery 152 and the negative end of battery 150 are connected to ground. Reed relay 148 further includes a driving coil 154 connected to be energized along a line 156, and a driving coil 158 connected to be energized from a line 160. When coil 154 is energized the relay is driven to connect the negative end of battery 152 to the line 70. On the other hand when coil 158 is energized the relay is driven to connect the positive end of the battery 150 to line 70. Coils 154 and 158 are wound around ferromagnetic cores to concentrate the magnetic fields for better attraction of the magnetic reed 149. When neither coil is energized, the reed self-centers to the OFF position.

In response to a pulse 144 produced by gate 128 on line 132, the monostable circuit 146 provides on line 160 an output pulse 162 (current J, FIG. 2) having a predetermined time duration, for example 100 milliseconds, sufficiently long to encompass the time during which pulse 116 is generated by the monostable 112 on line 118. The output pulse 162 is applied to the inhibit terminal 126 of gate 122 and also to the relay coil 158 to drive relay 148 to close the circuit between the positive end of battery 150 and line 70, thus to apply an EMPTY signal (curve K, FIG. 2) to line 46 and the indicating circuit 30 of the then connected unit U.

In the meantime the pulse 162 applied to the inhibit terminal 126 blocks the pulse 116 from the line 124 which is connected to the input of monostable circuit 147, whose output is connected to the relay driving coil 154. Thus when gate 128 produces a pulse 144 in response to reflections from the reflecting surface 22 of the then interrogated unit U, the reed relay operating coil 154 cannot be energized and the negative end of battery 152 cannot be connected to line 70.

In the event that a vehicle is present in the detection zone under interrogation, the incident energy beam from transducer system 18 is blocked from impinging on the reflecting surface 22 and gate 128 cannot produce an output pulse 144. Under these circumstances, pulse 116 on line 118 passes through gate 122 and into input of monostable 147 through line 124, thereby causing the monostable 147 to produce while driven into the quasi-stable state an output pulse 166 (curve M, FIG. 2) on line 156. Pulse 166 has a predetermined length for example 100 milliseconds. The output of monostable 147 on line 156 drives the relay 148 to connect the negative end of battery 152 to line 70 thereby applying an OCCUPIED signal (curve N, FIG. 2) to line 46 and to the indicating circuit 30 of the then interrogated unit U.

The operation of the disclosed example may be summarized as follows with the aid of the chart of FIG. 2 wherein:

A represents the commutator switch 16 and shows the 200 millisecond dwell time per contact which is coextensive with the time that the timing signal potential is applied to line 46;

B is the output on line 80 and shows timing pulse 78;

C is the output of monostable 82 showing the output pulse 84 generated during the quasi-stable or ON state;

D is the output on line 88 showing pulse 90 generated by monostable 82 reverting to its OFF or stable state;

E shows the time slots of the incident burst of wave energy 20, the received echo 24, if any, from vehicle, and the received echo 26, if any, from the floor;

F is the output of monostable 112 showing the pulse 114 generated in the ON or quasi-stable state;

G shows the status of the T-R switch 96;

H is the output of monostable 136 showing pulse 142 generated in the quasi-stable or ON state;

I is the output of gate 128 showing pulse 144 generated when coincident signals are applied to the two inputs of the gate as a result of echo received from the fixed reflecting surface 22;

J is the output of monostable 146 showing pulse 162 generated in response to the gate pulse 144;

K is the output of reed switch 148 in response to pulse 166;

L is the output on line 118 showing pulse 116 generated when monostable 112 reverts to its OFF or stable state;

M is the output of monostable 147 showing pulse 166 generated in response to pulse 116 only when there is no pulse 162 as is the case when a zone is occupied;

N is the outpuet of the reed switch 148 in response to pulse 166;

O shows the indicator lamp outfit if stall is first occupied, then empty; and

P is the indication lamp output if stall is first empty, then occupied.

Assume that commutator switch arm 40 is rotating clockwise at 2 r.p.m., the hereinbefore suggested speed, and has just engaged contact C2 at $T=-7$ ms. (see chart in FIG. 2) thus interrogating empty zone Z2 through its associated interrogation unit U2. The following events take place. A $T=0$, a timing pulse 78 derived from the timing potential source 38 appears on line 80. In response to the timing pulse 78, monostable 82 produces output pulse 84 extending from $T=0$ to $T=+5$ ms., and an output pulse 90 at $T=+5$ ms. In response to pulse 84, monostable 136 produces a pulse 142 extending from $T=+22$ ms. to $T=+26$ ms. which is applied to input 130 of gate 128.

In response to pulse 84 the transmitter system 48 produces a 2 millisecond burst of 40 kc. electrical oscillations (curve E), which burst is converted by the transducer system 18 of unit U2 into an ultrasonic incident burst 20 extending in time from $T=0$ to $T=+2$ ms. In any event the ultrasonic burst is confined to the period $T=0$ to $T=+5$ ms. At time $8=+5$ ms. the normally ineffective receiver 50 is rendered effective in response to pulse 90 which drives the monostable 112 to produce a positive output pulse 114 on line 98, a pulse 116 on line 118 occurring when pulse 114 terminates. Pulse 114 extends from $T=+5$ ms. to $T=+57$ ms. and pulse 116 occurs at $T=+57$ ms. Pulse 114 biases the T-R switch of the receiver system ON to render the receiver system effective to respond to 40 kc. electrical oscillations for a time period which encompasses the expected arrival times of echoes from the reflecting surface 22 and the top of a vehicle although only one of these echoes can occur depending on whether the zone is empty or occupied. Since the interrogation of zone 2 is currently being discussed, the zone being empty, the receiver system responds to reflections 26 from the reflecting surface 22 to produce an output pulse 92 which is applied to input gate terminal 94 of gate 128.

Since pulse 90 corresponds in time substantially to the received echo 26 from the reflecting surface 22 (curve E), pulse 90 arrives at input 94 of gate 128 during the dwell time of pulse 142 at input 130 of gate 128, resulting in an output pulse 144 at approximately $T=+23$ ms. In response to pulse 144 monostable 146 produces an output pulse 162 which places an inhibit restraint on the input 126 of inhibit gate 122 and also energizes relay coil 158 to operate relay 148 to connect the positive side of battery 150 to the line 70, thereby to transmit an EMPTY signal to the indicator system 30 of unit U2, thus to light the "empty" (green) lamp. In the meantime pulse 162 prevents pulse 116 on line 118 from reaching monostable 147. Since the duration of pulse 162 is from $T=+23$ ms. to $T=+123$ ms., relay 148 applies positive voltage (EMPTY SIGNAL) to line 70 during the same period. In its clockwise travel, commutator arm 40 disengages contact C2 at $T=+200$ ms.

A $T=+7,500$, that is 7,300 milliseconds later, contact arm 40 engages contact C1 to begin the interrogation of zone Z1 which is shown occupied by a vehicle V. For the dwell period of arm 40 relative to contact C1 time $T=+7,500$ corresponds to $T=-7$ ms. on the chart of FIG. 2.

As in the previously described operation, the transmitter supplies an ultrasonic burst, and pulses 116 and 142 are generated at the times indicated. However, since a vehicle is present in zone 1, the incident wave energy burst 20 is prevented from reaching the reflecting surface 22 and is instead reflected from the top of the vehicle V thus energizing the receiver system 49 to produce a pulse on line 94 at about $T=+12$ ms. However, since there is no input at this time on the line 130 to the gate 128, the gate does not produce an output pulse on line 132, and monostable 146 is not turned ON. At $T=+22$ ms. to $T=+26$ ms. when pulse 142 dwells at input terminal 130 of gate 128, there is no pulse 90 from the output of line 94 since the receiver system 49 has not received an echo from the reflecting surface 22. As a consequence, gate 128 does not produce an output pulse on line 132 and monostable 146 is not turned ON.

In the absence of an output pulse 162 from monostable 146, the inhibit gate 122 passes the pulse 116 at $T=+57$ ms. through the input line 24 of monostable 147. In response to pulse 116, monstable 147 is turned ON to produce an output pulse 166 on line 156 for the period extending from $T=+57$ ms. to $T=+157$ ms. As a consequence, relay winding 154 is energized for the period of pulse 166 to move the relay switch 148 to that position which connects line 70 to the negative side of battery 152 thereby to supply an OCCUPIED signal to line 46 and indicator circuit 30 of the then interrogated unit U1. This signal sets the flip-flop 32 to light the occupied lamp 34. At $T=+200$ contact arm 40 disengages contact C1.

As the contact arm 40 continues to rotate, zones Z3 and Z4 are interrogated in turn. Each of the four zones is interrogated once during each revolution of the commutator arm 40 so that there is a continuous monitoring of the zones.

The functions of inhibit gate 122 may be provided by a circuit equivalent shown in FIG. 3 wherein an AND gate 170 and a NOT gate 172 provide equivalent of the inhibit gate 122. The diagram in FIG. 3 is self-explanatory and needs only little explanation. In this figure, pulse 116 is sent along line 118 to one input of AND gate 170. The other input 174 of the AND gate is connected to the output of the NOT or inverting device logic element 172. The input of the NOT element 172 is connected to the output line 160 of monostable 146. The output of the AND gate 170 is connected through the line 124 to the input of monostable 164. If monostable 146 produces no output on line 160 there will be an output on line 174 and together with the pulse 116 on line 118 will produce an output on line 124 to operate the monostable 147 to provide a pulse on line 156. However, if monostable 146 is operated to produce an output on line 160 then there will be no output on line 174 and there can be no output from the AND gate 170 on line 124. Thus monostable 147 will be inhibited or blocked from producing an output on line 156.

A detailed example of flip-flop 32 is illustrated in FIG. 4 in order to show that the battery 38 of FIG. 1 may represent the potential level existing at the junction X (FIG. 4). The potential at this point provides an excellent timing potential supply, and as stated may be symbolical represented by the battery 38 tied to line 28 through a large resistor. Of course a separate battery 38 may be employed if desired. In FIG. 4, by way of example, R1 and R4 are each 4700 ohms, while the transistors are type 2N527.

It should be understood that, except for the transducer system 18 and the reflecting surface 22, the other components of the interrogation units U may be located remotely from the associated detection zones Z. For example, it may be desirable to have the indicator circuits 30 in a dispatcher's room at the entrance to the garage. It also may be desirable to mount all the indicator lamps of all the units U on a common lamp board, remote from the detection zones.

Since the various elements illustrated in block form in the drawings are well known in the art, details of such blocks are generally not shown or described. Transmitter and receiver circuits represented by the blocks 48 and 50 are well known in the art. Examples of such equipment may be found in U.S. Patent Numbers 3,042,303, 3,042,899, 3,063,179 and 3,110,008. The various monostable circuits shown may for example be monostable multivibrators which are well known in the art. Time delay circuits, coincidence gate circuits, inhibit gate circuits, and other gate circuits are well known and need no detail description. Gate 54 may be merely a device to apply an OFF bias to the oscillator 52, and in response to pulse 84 to provide for a predetermined time and ON bias to oscillator 52.

It is to be understood that to provide any of impedance matching, amplification, and polarity inversion, where required, circuit elements such as monostables, time delays, gates, etc., may be preceded or followed by suitable amplifiers or even incorporate amplifiers. Pulse shaping techniques are well known and may be employed where desired.

The receiver 50 may for example include amplifiers and a detector tuned to respond to the system operating frequency (example 40 kc.) and detect the echoes received by the transducer system. As hereinbefore noted such apparatus is well known in the art. If desired, the T-R switch 96 in the receiver system 49 may be continuously biased on, and the receiver 50 itself normally biased off to render it ineffective. For example, a receiver may include a detector stage and amplifier stages, in which case any of the stages may be normally biased OFF. in order to render such a receiver effective the output pulse 114 on line 98 may be applied to the off-biased receiver stage in a manner to nullify the off-bias, thereby to render the receiver effective to respond to electric energy representing reflected waves.

Although as hereinbefore pointed out, gated ultrasonic transmitters are well known, in FIG. 5 there is shown one example which may be employed as transmitter 48. In this figure, a blocking oscillator 52 includes a transistor T2 and a transformer TF having respective input, output and feedback windings IN, OT and FB. Normally the blocking oscillator is OFF due to direct current supplied by a normally on transistor T1 to the winding IN. In response to pulse 84 applied to the base of transistor T1 through inverting amplifier 180 and a capacitor C6, transistor T1 turns off for a time determined by the time constant of resistor R5 and capacitor C5, for example 2 milliseconds. During this time, the D.C. supply from transistor T1 to winding IN is cut off and the oscillator 52 oscillates in the known manner of a blocking oscillator at the frequency for which the system of FIG. 1 is designed to operate for example 40 kc. When the RC circuit associated with transistor T1 times out at the end of 2 milliseconds, transistor T1 turns on to turn off oscillator 52. In FIG. 5, the gate circuit 54 may be considered as including pulse inverter 180, capacitors C6 and C5, resistors R5 and R6, and transistor T1. The 2 ms. oscillatory burst in output winding OT is amplified by a suitable amplifier 182 coupled through an output transformer 184 to line 58, which in turn is connected to winding 60 to transformer 62 in FIG. 1.

In FIG. 5, components may have the following exemplary values:

| | | |
|---|---|---|
| Resistor R5 | ohms | 10,000 |
| Resistor R6 | do | 3,000 |
| Resistor R7 | do | 300 |
| Resistor R8 | do | 100,000 |
| Resistor R9 | do | 3,000 |
| Capacitor C5 | microfarads | .003 |
| Capacitor C6 | do | .33 |
| Capacitor C7 | do | .001 |
| Transistors T1 and T2 | | 2N404 |
| Voltage —V | volts | —12 |

It is to be understood that the herein described arrangements are simply illustrative of the principles of the invention, and that other embodiments and applications are within the spirit and scope of the invention.

What is claimed is:

1. A system for monitoring a plurality of detection zones to determine whether any zone is empty or occupied by an object, said system comprising;
   (a) a plurality of units, one associated with each detection zone, each unit comprising a fixed wave energy reflecting surface aligned with its associated detection zone, transducer means for transmitting and receiving wave energy, said transducer means being arranged to transmit an incident wave energy beam toward said reflecting surface and to receive reflections of said beam from said reflecting surface, the arrangement being such that if the associated detection zone is empty, the incident energy beam passes through the detection zone and impinges on the fixed reflecting surface, and if the zone is occupied by an object, the incident beam is blocked from impinging on the fixed reflecting surface, first conductor means coupled to said transducer means for carrying to and from said transducer means electrical energy corresponding to wave energy, and indicating means coupled to said first conductor means for indicating whether the zone is occupied or empty in response to occupied and empty signals, respectively, received by said first conductor means;
   (b) second conductor means;
   (c) cyclic sequencing switch means coupled to said second conductor means and to all said first conductor means for periodically connecting the second conductor means sequentially to each first conductor means for a given length of time, whereby each detection zone is interrogated during the dwell time that its associated first conductor means is connected to the second conductor means; and
   (d) interrogation control apparatus coupled to said second conductor means for initiating response to a timing signal and producing the following cycle of operations during the dwell time that the second conductor means is connected to any one of said first conductor means: first generating and applying to said second conductor means a burst of electrical energy for conversion to an incident wave energy beam by the transducer means associated with the then interrogated detection zone, then detecting the receiver output status of that transducer means and in accordance herewith apply to the second conductor means either an occupied or an empty signal depending on whether the then interrogated detection zone is occupied or empty; whereby the indicating means associated with the then interrogated zone indicates presence or absence as the case may be of an object in that zone.

2. The combination of claim 1 wherein there is means for producing a timing signal in response to each instance of connection established between said second conductor means and any of the first conductor means through said sequencing switch means, and wherein said interrogation control apparatus includes means responsive to said timing signal for initiating said cycle of operations.

3. The combination of claim 2 wherein said interrogation control apparatus comprises:
   (a) transmitter means coupled to said second conductor means for supplying in response to said timing signal an electrical energy burst within a first time period to the transducer means of the then interrogated zone;
   (b) receiver means coupled to said second conductor means for producing an output signal in response to wave energy reflections received by the transducer means of the then interrogated zone, said receiver means being normally ineffective to produce an output in response to reflections received by that transducer means;
   (c) means responsive to said timing signal for rendering said receiver means effective relative to the then interrogated zone to produce an output in response to wave energy reflections received by the transducer means of that zone at any time during a second time period that begins after said first time period, said second period being greater than the round trip transit time of an energy burst from that transducer means to the fixed reflecting surface associated with the then interrogated zone and back to the transducer means;
   (d) coincidence gate means having first and second input means for producing a gate output signal in response to coincident input signals received at its first and second input means, the output of said receiver means being connected to one input means of the gate means;
   (e) means responsive to said timing signal for supplying to the other input means of the gate means a signal over a third time period encompassing the expected arrival time of reflections from the reflecting surface but excluding the expected arrival time of reflections from the object if present in the then interrogated detection zone;
   (f) first indicating signal producing means responsive to said gate output signal for producing and applying an empty signal to said second conductor means over a predetermined fourth time period starting with the production of said gate output signal;
   (g) second indicating signal producing means responsive to said timing signal for producing and applying an occupied signal to said second conduction means over a fifth time period starting after the end of said second time period; and
   (h) means responsive to said gate output signal for rendering said second indicating signal producing means ineffective to produce an occupied signal;
   (i) all said time periods occurring within said dwell time of the detection zone under interrogation.

4. The combination as in claim 3 wherein the first mentioned means in clause *h* includes means responsive to said first indicating signal producing means.

5. The combination as in claim 3 wherein said system is so constructed that said wave energy is sonic energy.

6. The combination as in claim 1 wherein said system is so constructed that said wave energy is sonic energy.

7. A system for determining whether a detection zone is empty or occupied by an object, said system comprising:
   (a) a fixed wave energy reflecting surface aligned with the detection zone;
   (b) transducer means for transmitting and receiving wave energy, said transducer means being arranged to transmit an incident wave energy beam toward said reflecting surface and to receive reflections of said beam from said reflecting surface, the arrangement being such that if the detection zone is empty, the incident energy beam passes through the detection zone and impinges on the fixed reflecting surface, and in the presence of an object in the detection zone the incident beam is blocked from impinging on the fixed reflecting surface;
   (c) indicating means for indicating the persence and absence of an object in response to object-presence and object-absent signals, respectively, received thereby;
   (d) means for generating a start signal;
   (e) transmitter means coupled to said transducer means for supplying in response to said start signal an electrical energy burst to said transducer means within a first time period;
   (f) receiver means coupled to said transducer means for producing an output signal in response to reflections received by said transducer means, said receiver means being normally ineffective to produce an output in response to reflections received by the transducer means;

(g) means responsive to said start signal for rendering said receiver means effective to produce an output in response to energy reflections received by said transducer means at any time during a second time period which begins after said first time period, said second time period being greater than the round trip transit time of an energy burst from the transducer means to the reflecting surface and back to the transducer means;

(h) coincidence gate means having first and second input means for producing a gate output signal in response to coincident input signals received at its first and second input means, the output of said receiver means being connected to one input means of the gate means;

(i) means responsive to said start signal for supplying to the other input means of the gate means a signal over a third time period encompassing the expected arrival time of reflections from the fixed reflecting surface but excluding the expected arrival time of reflections from an object if present in the detection zone;

(j) first indicating signal producing means responsive to said gate output signal for producing and applying an empty signal to said indicating means over a predetermined fourth time period starting with the production of said gate output signal;

(k) second indicating signal producing means responsive to said start signal for producing and applying an occupied signal over a fifth time period starting after the end of said second time period; and (l) means responsive to said first indicating signal producing means for rendering said second indicating signal producing means ineffective to produce an occupied signal during the existence of an empty signal.

8. The combination as in claim 7 wherein said system is so constructed that said wave energy is sonic energy.

References Cited

UNITED STATES PATENTS

| | | | |
|---|---|---|---|
| 2,422,069 | 6/1947 | Bedford | 343—16 |
| 3,086,196 | 4/1963 | Sande | 340—258 X |
| 3,109,650 | 11/1963 | Torresen | 340—280 X |
| 3,284,082 | 11/1966 | Isenberg et al. | 340—280 X |

JOHN W. CALDWELL, *Primary Examiner.*

D. L. TRAFTON, *Assistant Examiner.*